(12) United States Patent
Ito et al.

(10) Patent No.: US 10,302,150 B2
(45) Date of Patent: May 28, 2019

(54) CLUTCH

(71) Applicant: AISIN AW CO., LTD., Anjo-shi, Aichi-ken (JP)

(72) Inventors: Kazuyoshi Ito, Tsushima (JP); Keizo Araki, Hekinan (JP); Mayuko Matsukage, Okazaki (JP)

(73) Assignee: AISIN AW CO., LTD., Anjo-shi, Aichi-ken (JP)

( * ) Notice: Subject to any disclaimer, the term of this patent is extended or adjusted under 35 U.S.C. 154(b) by 449 days.

(21) Appl. No.: 15/021,115

(22) PCT Filed: Sep. 26, 2014

(86) PCT No.: PCT/JP2014/075707
§ 371 (c)(1),
(2) Date: Mar. 10, 2016

(87) PCT Pub. No.: WO2015/046461
PCT Pub. Date: Apr. 2, 2015

(65) Prior Publication Data
US 2016/0215831 A1    Jul. 28, 2016

(30) Foreign Application Priority Data
Sep. 26, 2013  (JP) .................................. 2013-199675

(51) Int. Cl.
*F16D 25/06*    (2006.01)
*F16D 25/0638*  (2006.01)
(Continued)

(52) U.S. Cl.
CPC ......... *F16D 25/0638* (2013.01); *F16D 25/12* (2013.01); *F16D 25/123* (2013.01);
(Continued)

(58) Field of Classification Search
CPC .... F16D 25/0638; F16D 25/123; F16D 13/72; F16D 2069/004; F16H 45/02; F16H 2045/0284; F16H 2045/0215
See application file for complete search history.

(56) References Cited

U.S. PATENT DOCUMENTS 4,371,066 A * 2/1983 Fujioka ............... F16D 25/0638
                                              192/70.27
5,535,870 A * 7/1996 Takezaki ................ F16D 13/52
                                              192/107 M
(Continued)

FOREIGN PATENT DOCUMENTS

DE         69708447 T2    6/2002
DE    10 2008 060 940 A1  6/2010
(Continued)

OTHER PUBLICATIONS

International Search Report for PCT/JP2014/075707 dated Dec. 22, 2014.
Written Opinion for PCT/JP2014/075707 dated Dec. 22, 2014.

*Primary Examiner* — Stacey A Fluhart
(74) *Attorney, Agent, or Firm* — Sughrue Mion, PLLC

(57) ABSTRACT

In a lock-up clutch of a starting device, a one-sided friction plate is adopted as a first friction engagement plate fitted with a clutch hub on the power input side and a second friction engagement plate fitted with a clutch drum on the power output side; an engagement oil chamber is defined between a lock-up piston and a flange member; a supply oil passage through which working oil is supplied to the first and second friction engagement plates and is defined between the lock-up piston and a front cover; a return oil passage for the working oil which has passed through the first and second friction engagement plates and is defined on (Continued)

the side of the flange member opposite to the lock-up piston; and the return oil passage communicates with the supply oil passage.

18 Claims, 6 Drawing Sheets

(51) Int. Cl.
*F16H 45/02* (2006.01)
*F16D 25/12* (2006.01)
*F16D 69/00* (2006.01)
*F16D 13/72* (2006.01)

(52) U.S. Cl.
CPC ............. *F16H 45/02* (2013.01); *F16D 13/72* (2013.01); *F16D 2069/004* (2013.01); *F16D 2300/0214* (2013.01); *F16D 2300/22* (2013.01); *F16H 2045/021* (2013.01); *F16H 2045/0215* (2013.01); *F16H 2045/0226* (2013.01); *F16H 2045/0284* (2013.01)

(56) References Cited

U.S. PATENT DOCUMENTS

| | | | |
|---|---|---|---|
| 5,617,941 A * | 4/1997 | Takahashi | B21K 1/30 192/107 R |
| 6,135,256 A | 10/2000 | Han et al. | |
| 6,142,280 A * | 11/2000 | Koike | F16D 25/0638 192/113.34 |
| 8,215,470 B2 | 7/2012 | Ishikawa et al. | |
| 2004/0074708 A1 * | 4/2004 | Schmidt | F16D 25/0638 188/71.5 |
| 2005/0284723 A1 * | 12/2005 | Zagrodzki | F16D 25/0638 192/70.14 |
| 2008/0006501 A1 * | 1/2008 | Haupt | F16D 13/72 192/70.12 |
| 2008/0121488 A1 | 5/2008 | Miyazaki et al. | |
| 2008/0142331 A1 | 6/2008 | Miyazaki et al. | |
| 2009/0084652 A1 * | 4/2009 | Kummer | F16D 13/683 192/113.1 |

FOREIGN PATENT DOCUMENTS

| | | | |
|---|---|---|---|
| DE | 102016123627 A1 * | 6/2017 | ............. F16D 13/52 |
| EP | 2363612 A1 * | 9/2011 | ......... F16D 25/0638 |
| EP | 2713069 A2 * | 4/2014 | ............. F16D 13/52 |
| JP | 05-052371 U | 7/1993 | |
| JP | 2002-106597 A | 4/2002 | |
| JP | 2005-036958 A | 2/2005 | |
| JP | 2006-351827 A | 7/2008 | |
| JP | 2008-151205 A | 7/2008 | |
| JP | 2008-163982 A | 7/2008 | |
| JP | 2009-243597 A | 10/2009 | |
| JP | 2011-117516 A | 6/2011 | |
| JP | 2012-017808 A | 1/2012 | |
| JP | 2012-215221 A | 11/2012 | |
| JP | 2012215221 A * | 11/2012 | |

* cited by examiner

CLUTCH

CROSS REFERENCE TO RELATED APPLICATIONS

This application is a National Stage of International Application No. PCT/JP2014/075707 filed Sep. 26, 2014, claiming priority based on Japanese Patent Application No. 2013-199675 filed Sep. 26, 2013, the contents of all of which are incorporated herein by reference in their entirety.

TECHNICAL FIELD

The present disclosure relates to a clutch that couples an input member and an output member to each other such that power is transferred from the input member to the output member and that decouples the input member and the output member from each other.

BACKGROUND ART

There has hitherto been known a clutch that couples a front cover, which serves as an input member coupled to a crankshaft of an engine, and an attachment portion, which serves as an output member coupled to an output shaft, to each other and that decouples the front cover and the attachment portion from each other (see Patent Document 1, for example). The clutch includes: a flange member coupled to a cylindrical connection portion formed on the front cover; a plurality of clutch plates (mating plates) fitted with a clutch hub fixed to the flange member; a plurality of clutch disks fitted with a clutch drum coupled to the attachment portion via a damper mechanism; a piston member that is disposed between the front cover and the flange member and that is movable in the axial direction to press the clutch plates and the clutch disks; and a return spring disposed between the front cover and the piston member. The clutch disks of the clutch are each a two-sided friction plate in which a sheet-shaped wet friction material is bonded to both surfaces. The clutch plates and the clutch disks are supplied with working oil for lubrication and cooling from a hydraulic control device via an in-flow hole formed in the attachment portion and a communication hole formed in the flange member. The working oil having passed through the clutch plates and the clutch disks flows around the damper mechanism etc., and thereafter is discharged to the hydraulic control device via an oil passage that does not communicate with the in-flow hole of the attachment portion or the communication hole of the flange member.

RELATED-ART DOCUMENTS

Patent Documents

[Patent Document 1] Japanese Patent Application Publication No. 2011-117516 (JP 2011-117516 A)

SUMMARY

In a multi-plate clutch such as that discussed above, it is possible to improve the efficiency in transferring power via the clutch and the fuel efficiency of the engine (motor) by executing slip control in which the rotational speed difference (actual slip speed) between the input member and the output member is caused to coincide with a target slip speed. In the clutch according to the related art described above, however, it is necessary to supply a large amount of working oil from the hydraulic control device to the clutch plates and the clutch disks in order to suppress generation of heat from the friction materials during execution of the slip control. Increasing the surface area of the friction materials can reduce the amount of working oil for lubrication and cooling to be supplied, but incurs an increase in cost and size of the clutch.

Thus, it is a main object of the present subject matter to improve the heat radiation performance of a friction material during execution of slip control while reducing the amount of cooling oil for lubrication and cooling to be supplied to a clutch.

The present disclosure provides a clutch that couples an input member and an output member to each other such that power is transferred from the input member to the output member and that decouples the input member and the output member from each other, characterized by including:

an annular member attached to the input member;

a clutch hub provided to the input member or the annular member;

a first friction engagement plate fitted with the clutch hub;

a clutch drum coupled to the output member and disposed on a radially outer side of the clutch hub such that the clutch hub is surrounded;

a second friction engagement plate fitted with the clutch drum; and a piston that is disposed between the input member and the annular member and that is movable in an axial direction to press the first and second friction engagement plates, in which:

the first and second friction engagement plates are each a one-sided friction plate that includes an annular plate, a friction material affixed to one surface of the annular plate, and a plate oil passage formed on the one surface of the annular plate so as to be dented with respect to a surface of the friction material;

an engagement oil chamber, to which working oil is supplied, is defined in one of a space between the piston and the annular member and a space between the piston and the input member, and a supply oil passage, through which cooling oil is supplied to the first and second friction engagement plates via an opening formed in the clutch hub, is defined in the other of the spaces; and a return oil passage for the cooling oil which has passed through the first and second friction engagement plates is defined along a back surface of the annular member on a side opposite to the piston, and the return oil passage communicates with the supply oil passage.

The clutch adopts, as the first friction engagement plate fitted with the clutch hub on the input member side and the second friction engagement plate fitted with the clutch drum on the output member side, a one-sided friction plate that includes an annular plate, a friction material affixed to one surface of the annular plate, and a plate oil passage formed on the one surface of the annular plate such that the plate oil passage is dented with respect to the surface of the friction material. In addition, an engagement oil chamber, to which working oil is supplied, is defined in one of a space between the piston and the annular member and a space between the piston and the input member, and a supply oil passage, through which cooling oil is supplied to the first and second friction engagement plates via an opening formed in the clutch hub, is defined in the other of the spaces. In the clutch, a return oil passage for the cooling oil which has passed through the first and second friction engagement plates is defined along a back surface of the annular member on a side opposite to the piston, and the return oil passage communicates with the supply oil passage.

In the thus configured clutch, when the rotational speed difference (actual slip speed) between the input member and the output member is caused to coincide with a target slip speed through slip control with the rotational speed of the input member higher than the rotational speed of the output member, the rotational speed of the first friction engagement plate, which is fitted with the clutch hub on the input member side, becomes higher than the rotational speed of the second friction engagement plate, which is fitted with the clutch drum on the output member side. Thus, the pressure of cooling oil in a region in the plate oil passage of the first friction engagement plate on the clutch hub side (inner side) is lowered because of an increase in flow velocity of cooling oil that flows from the clutch hub side to the clutch drum side in the plate oil passage of the first friction engagement plate and the effect of a centrifugal force (centrifugal hydraulic pressure) that acts on the cooling oil. As a result, cooling oil in the plate oil passage of the second friction engagement plate flows into the plate oil passage of the first friction engagement plate on the clutch hub side (inner peripheral side) of the first and second friction engagement plates. Accordingly, part of the cooling oil which has flowed out from the plate oil passage of the first friction engagement plate flows into the plate oil passage of the second friction engagement plate via the clearance between the clutch drum and the second friction engagement plate on the clutch drum side (outer peripheral side) of the first and second friction engagement plates.

Consequently, in the clutch, when slip control is executed with the rotational speed of the input member higher than the rotational speed of the output member, cooling oil can be circulated through the plate oil passages, which are positioned on both sides of the annular plate of the second friction engagement plate, with cooling oil caused to flow from the clutch drum side to the clutch hub side through the plate oil passage of the second friction engagement plate. Further, cooling oil circulates around the first and second friction engagement plates, and part of the cooling oil which has passed through the first and second friction engagement plates flows out to the return oil passage side, which allows the cooling oil which has flowed into the return oil passage to flow again into the supply oil passage from the return oil passage. Thus, in the clutch, cooling oil can be circulated also through a path that extends through the supply oil passage, the first and second friction engagement plates, the return oil passage, and the supply oil passage. As a result, it is possible to increase the amount of cooling oil that flows (circulates) around the first and second friction engagement plates (friction materials) to cause heat exchange with the friction materials without increasing the amount of cooling oil for lubrication and cooling to be supplied to the first and second friction engagement plates (supply oil passage), and to cause the cooling oil which has been raised in temperature by removing heat from the friction materials of the first and second friction engagement plates to be lowered in temperature in the return oil passage and then flow again into the supply oil passage. Thus, in the clutch, it is possible to improve the heat radiation performance of the friction materials of the first and second friction engagement plates during execution of slip control while reducing the amount of cooling oil for lubrication and cooling to be supplied to the first and second friction engagement plates.

The return oil passage may communicate with the supply oil passage via a communication passage defined on an inner side with respect to an inner peripheral surface of the piston. Consequently, a sufficient length of the return oil passage is secured, which makes it possible to lower the temperature of the cooling oil which has passed through the first and second friction engagement plates well while the cooling oil is flowing through the return oil passage.

The first and second friction engagement plates may be fitted with the clutch hub and the clutch drum, respectively, such that the friction material is positioned on a side of the piston. Consequently, a separator plate (annular plate) to which the friction material is not affixed can be fitted with the clutch hub etc. so as to be positioned closest to the piston. As a result, the separator plate can be replaced easily, which makes it possible to adjust the stroke of the piston easily by changing the thickness of the separator plate.

The first and second friction engagement plates may be fitted with the clutch hub and the clutch drum, respectively, such that the friction material is positioned on a side of the input member. Consequently, part of the cooling oil which has flowed out from the plate oil passage of the first friction engagement plate flows into the plate oil passage of the second friction engagement plate positioned on the side of the input member, which has a larger surface area to contact outside air, on the clutch drum side (outer peripheral side) of the first and second friction engagement plates. As a result, it is possible to suppress a rise in temperature of cooling oil that flows through the plate oil passage of the second friction engagement plate from the clutch drum side to the clutch hub side.

The second friction engagement plate may be spline-fitted to the clutch drum; and tooth depth of splines of the second friction engagement plate may be greater than tooth depth of splines of the clutch drum. Consequently, a sufficient clearance is secured between the clutch drum and the second friction engagement plate, which makes it possible to cause the cooling oil which has flowed out from the plate oil passage of the first friction engagement plate to smoothly flow into the plate oil passage of the second friction engagement plate.

The input member may include a tubular center piece to which the annular member is attached and which supports the piston; the output member may be inserted into the center piece with a thrust washer disposed between the center piece and the output member; and the return oil passage may communicate with the supply oil passage via an oil groove formed in the thrust washer, a communication passage defined between an inner peripheral surface of the center piece and the output member, and an oil passage formed in the center piece. Consequently, it is possible to form an oil passage that allows communication between the supply oil passage and the return oil passage in a narrow space around the center piece and the output member.

The input member may be coupled to a motor, and the output member may be coupled to the clutch drum via a damper mechanism and coupled to an input shaft of a transmission; and the clutch may be constituted as a lock-up clutch that selectively establishes and releases lock-up in which the input member and the output member are coupled to each other.

The present disclosure also provides
a clutch that couples an input member and an output member to each other such that power is transferred from the input member to the output member and that decouples the input member and the output member from each other, characterized by including:
a clutch hub that rotates together with the input member;
a first friction engagement plate fitted with the clutch hub;

a clutch drum coupled to the output member and disposed on a radially outer side of the clutch hub such that the clutch hub is surrounded;

a second friction engagement plate fitted with the clutch drum; and an engagement oil chamber to which working oil is supplied; and a piston that is movable in an axial direction of the input member and the output member in accordance with supply of working oil to the engagement oil chamber to press the first and second friction engagement plates, in which:

the first and second friction engagement plates are each a one-sided friction plate that includes an annular plate, a friction material affixed to one surface of the annular plate, and a plate oil passage formed on the one surface of the annular plate so as to be dented with respect to a surface of the friction material;

a first space is defined on a radially inner side of the clutch hub so as to be adjacent to the engagement oil chamber in the axial direction, the first space being configured to supply cooling oil to the first and second friction engagement plates via an opening formed in the clutch hub; and a second space into which the cooling oil which has passed through the first and second friction engagement plates flows communicates with the first space on a radially inner side with respect to the piston.

In the clutch, when slip control is executed with the rotational speed of the input member higher than the rotational speed of the output member, cooling oil can be circulated through the plate oil passages, which are positioned on both sides of the annular plate of the second friction engagement plate, with cooling oil caused to flow from the clutch drum side to the clutch hub side through the plate oil passage of the second friction engagement plate. Further, cooling oil circulates around the first and second friction engagement plates, and part of the cooling oil which has passed through the first and second friction engagement plates flows out to the second space side, which allows the cooling oil which has flowed into the second space to flow again into the first space from the second space. Thus, in the clutch, cooling oil can be circulated also through a path that extends through the first space, the first and second friction engagement plates, the second space, and the first space. As a result, it is possible to increase the amount of cooling oil that flows (circulates) around the first and second friction engagement plates (friction materials) to cause heat exchange with the friction materials without increasing the amount of cooling oil for lubrication and cooling to be supplied to the first and second friction engagement plates (first space), and to cause the cooling oil which has been raised in temperature by removing heat from the friction materials of the first and second friction engagement plates to be lowered in temperature in the second space and then flow again into the first space. Thus, in the clutch, it is possible to improve the heat radiation performance of the friction materials of the first and second friction engagement plates during execution of slip control while reducing the amount of cooling oil for lubrication and cooling to be supplied to the first and second friction engagement plates.

DETAILED DESCRIPTION OF THE PREFERRED EMBODIMENT

Now, an embodiment of the present subject matter will be described with reference to the drawings.

Figure 1:
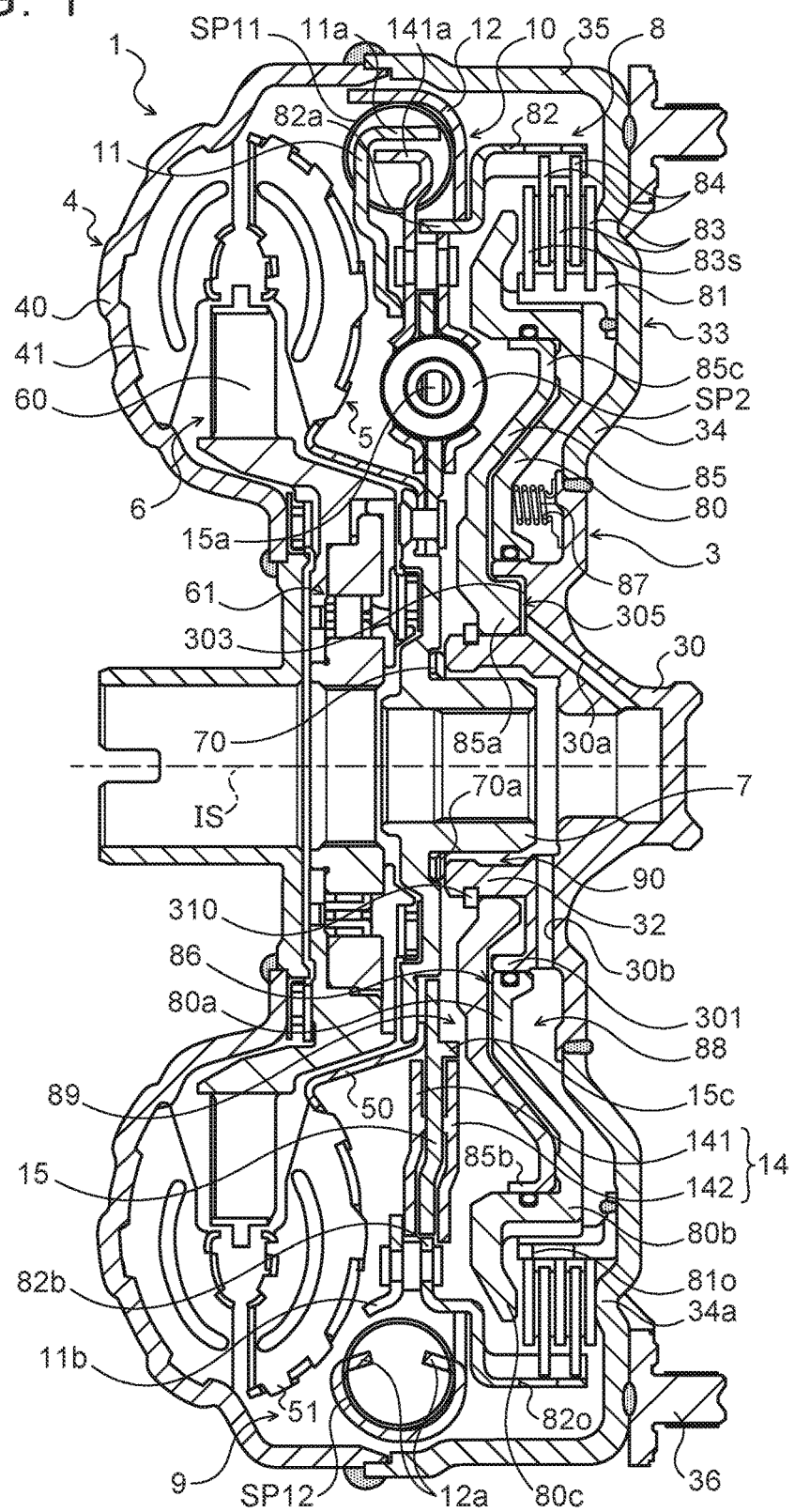
FIG. 1 is a sectional view illustrating a starting device that includes a clutch according to an exemplary embodiment.

FIG. 1 is a sectional view illustrating a starting device 1 that includes a clutch according to an exemplary embodiment. The starting device 1 illustrated in the drawing is mounted on a vehicle that includes an engine (internal combustion engine) that serves as a motor (not illustrated). The starting device 1 includes: a front cover 3 that serves as an input member coupled to a crankshaft of the engine; a pump impeller (an input-side fluid transmission element) 4 fixed to the front cover 3; a turbine runner (an output-side fluid transmission element) 5 disposed coaxially with the pump impeller 4 to be rotatable; a turbine hub 7 that serves as an output member fixed to an input shaft IS of a transmission which is an automatic transmission (AT) or a continuously variable transmission (CVT) (not illustrated); a hydraulic multi-plate lock-up clutch 8 which is the clutch according to an exemplary embodiment; and a damper mechanism 10 coupled to the turbine hub 7.

The front cover 3 includes a center piece 30 and a cover body 33 fixed to the center piece 30 by welding. The center piece 30 includes a large-diameter cylindrical portion (tubular portion) 301 positioned on the side of the engine (not illustrated) (right side in FIG. 1), and a cylindrical small-diameter cylindrical portion 302 formed on the inner side of the large-diameter cylindrical portion 301 such that the cylindrical small-diameter portion 302 projects toward the damper mechanism 10 with respect to the large-diameter cylindrical portion 301. In the embodiment, the small-diameter cylindrical portion 302 of the center piece 30 is formed closer to the damper mechanism 10 than an end portion of the large-diameter cylindrical portion 301 on the damper mechanism 10 side as seen in the radial direction. Consequently, an annular recessed portion 303 surrounded by the large-diameter cylindrical portion 301 and dented in the axial direction to the engine side (right side in FIG. 1) is formed in the center piece 30.

A plurality of (e.g. six) rotation restriction recessed portions (not illustrated) dented in the axial direction to the engine side (right side in FIG. 1) are formed at equal intervals in the recessed portion 303 of the center piece 30. In addition, the turbine hub 7 is rotatably inserted into the small-diameter cylindrical portion 302 of the center piece 30. A thrust washer 70 is disposed between an end surface of the small-diameter cylindrical portion 302 and the turbine hub 7 in the axial direction. Further, the cover body 33 of the front cover 3 includes a side wall portion 34 that extends in the radial direction from the center piece 30, and an outer tubular portion 35 that extends in the axial direction of the starting device 1 from the outer periphery of the side wall portion 34. A set block 36 to be coupled to a drive plate (not illustrated) attached to the crankshaft of the engine (not illustrated) is fixed by welding or the like to the outer peripheral portion of the side wall portion 34 of the cover body 33.

The pump impeller 4 includes a pump shell 40 tightly fixed to the outer tubular portion 35 of the front cover 3, and a plurality of pump blades 41 disposed on the inner surface of the pump shell 40. The turbine runner 5 includes a turbine shell 50, and a plurality of turbine blades 51 disposed on the inner surface of the turbine shell 50. As illustrated in FIG. 1, the turbine shell 50 is fitted with the turbine hub 7, and fixed to the turbine hub 7 via a rivet. The pump impeller 4 and the turbine runner 5 face each other. A stator 6 that rectifies a flow of working oil (a working fluid) from the turbine runner 5 to the pump impeller 4 is disposed between and coaxially with the pump impeller 4 and the turbine runner 4.

The stator 6 includes a plurality of stator blades 60. The rotational direction of the stator 6 is set to only one direction by a one-way clutch 61. The pump impeller 4, the turbine runner 5, and the stator 6 form a torus (an annular flow passage) that allows circulation of working oil, and function as a torque converter (a fluid transmission device) with a torque amplification function. It should be noted, however, that the stator 6 and the one-way clutch 61 may be omitted from the starting device 1, so that the pump impeller 4 and the turbine runner 5 function as a fluid coupling.

As illustrated in FIG. 1, the damper mechanism 10 includes; a drive member 11 that serves as an input element; a first intermediate member 12 coupled to (engaged with) the drive member 11 via a plurality of first outer peripheral springs (first elastic elements) SP11; a second intermediate member 14 that are coupled to (engaged with) the first intermediate member 12 via a plurality of second outer peripheral springs (first elastic elements) SP12 and that constitute an intermediate element together with the first intermediate member 12; and a driven member (an output element) 15 coupled to (engaged with) the second intermediate member 14 via a plurality of inner peripheral springs (second elastic elements) SP2.

In the damper mechanism 10, the first and second outer peripheral springs SP11 and SP12 are each a coil spring made of a metal material spirally wound so as to have an axis that extends straight when no load is applied, and are compressed through relative rotation between the drive member 11 and the first and second intermediate members 12 and 14, respectively. Meanwhile, the inner peripheral springs SP2 are each an arc spring made of a metal material wound so as to have an axis that extends in an arc shape when no load is applied, and are compressed through relative rotation between the second intermediate member 14 and the driven member 15. It should be noted, however, that the inner peripheral springs SP2 may be an arc spring formed from a single coil, or a coil spring.

The drive member 11 includes a plurality of spring abutment portions 11a that abut against respective first ends of the corresponding first outer peripheral springs SP11, and a plurality of spring support portions 11b. The drive member 11 is coupled to the front cover 3, which serves as the input member, via the lock-up clutch 8, and disposed in an outer peripheral region in a fluid transmission chamber 9 defined by the front cover 3 and the pump shell 40 of the pump impeller 4. The first intermediate member 12 is constituted as an annular member that can slidably support, together with the plurality of spring support portions 11b of the drive member 11, the first and second outer peripheral springs SP11 and SP12 on the same circumference and adjacent to each other (alternately). In the embodiment, the first intermediate member 12 is supported by a constituent member of the lock-up clutch 8 so as to be rotatable about the axis of the starting device 1 and is disposed in an outer peripheral region in the fluid transmission chamber 9. In addition, the first intermediate member 12 includes a plurality of pairs of spring abutment portions 12a disposed between respective second ends of the corresponding first outer peripheral springs SP11 and respective first ends of the second outer peripheral springs SP12 which are adjacent to the first outer peripheral springs SP11 to abut against the second ends of the first outer peripheral springs SP11 and the first ends of the second outer peripheral springs SP12.

The second intermediate member 14 includes an annular first plate member 141, and an annular second plate member 142 coupled (fixed) to the first plate member 141 via a rivet such that the inner peripheral springs SP2 and the driven member 15 are interposed together with the first plate member 141. The first plate member 141 of the second intermediate member 14 includes a plurality of spring abutment portions (second abutment portions) 141a that are provided in the outer peripheral portion and that abut against respective second ends of the corresponding second outer peripheral springs SP12, and a plurality of spring support portions (not illustrated) that are provided in the inner peripheral portion and that support the inner peripheral springs SP2. In addition, the second plate member 142 of the second intermediate member 14 includes a plurality of spring support portions (not illustrated) that face the respective spring support portions of the first plate member 141 to support the inner peripheral springs SP2. The first and second plate members 141 and 142 are formed with a plurality of spring abutment portions (not illustrated) that abut against respective first ends of the corresponding inner peripheral springs SP2.

Consequently, the plurality of first outer peripheral springs SP11 are disposed in the outer peripheral portion of the damper mechanism 10 so as to be positioned between the spring abutment portions 11a of the drive member 11 and the spring abutment portions 12a of the first intermediate member 12, and the plurality of second outer peripheral springs SP12 are disposed in the outer peripheral portion of the damper mechanism 10 so as to be positioned between the spring abutment portions 12a of the first intermediate member 12 and the second intermediate member 14, that is, the spring abutment portions 141a of the first plate member 141. In addition, the plurality of inner peripheral springs SP2 are disposed away from the first and second outer peripheral springs SP11 and SP12 in the radial direction of the starting device 1, and positioned on the inner side with respect to the first and second outer peripheral springs SP11 and SP12.

The driven member 15 is disposed between the first plate member 141 and the second plate member 142 of the second intermediate member 14, and fixed to the turbine hub 7 via a rivet together with the turbine shell 50. In addition, the driven member 15 includes a plurality of spring abutment portions 15a that abut against respective second ends of the corresponding inner peripheral springs SP2. Further, the driven member 15 includes a plurality of plate support portions 15c that project in the axial direction to rotatably support the inner periphery of the second plate member 142 of the second intermediate member 14. Consequently, the second intermediate member 14 is rotatably supported by the driven member 15 and is disposed about the axis of the starting device 1.

The lock-up clutch 8 can selectively establish and release lock-up in which the pump impeller 4 and the turbine runner 5, that is, the front cover 3 and the input shaft IS of the transmission which is fixed to the turbine hub 7, are mechanically coupled to each other (via the damper mechanism 10). In addition, it is possible to improve the efficiency in transferring power via the lock-up clutch 8 and the fuel efficiency of the engine (motor) by executing slip control in which the lock-up clutch 8 is controlled such that the rotational speed difference (actual slip speed) between the engine, that is, the front cover 3, and the input shaft IS, that is, the turbine hub 7, coincides with a target slip speed. As illustrated in FIG. 1, the lock-up clutch 8 is disposed in the fluid transmission chamber 9 which is defined by the front cover 3 and the pump shell 40 of the pump impeller 4 so as to be positioned inside the front cover 3, more particularly between the side wall portion 34 of the front cover 3 and the damper mechanism 10.

As illustrated in the drawing, the lock-up clutch 8 includes: a lock-up piston 80 supported by the center piece 30 of the front cover 3 so as to be movable in the axial direction; an annular clutch hub 81 fixed to the front cover 3; a clutch drum 82 coupled to the input shaft IS of the transmission via the damper mechanism 10; a plurality of first friction engagement plates 83 spline-fitted to the outer periphery of the clutch hub 81; a plurality of second friction engagement plates 84 spline-fitted to the inner periphery of the clutch drum 82; and an annular flange member (annular member) 85 attached to the center piece 30 of the front cover 3. The flange member 85 is disposed so as to be positioned on the side opposite to the side wall portion 34 of the front cover 3 with respect to the lock-up piston 80, that is, so as to be positioned on the side of the turbine hub 7 and the damper mechanism 10 with respect to the lock-up piston 80.

The lock-up piston 80 includes: an inner peripheral portion 80a that is fitted with the large-diameter cylindrical portion 301 of the center piece 30 and that faces the inner surface of the front cover 3 (such as the side wall portion 34 of the cover body 33); a tubular portion 80b that extends from the outer peripheral portion of the inner peripheral portion 80a toward the damper mechanism 10 and in the axial direction; and a pressing portion 80c that extends from the tubular portion 80b outward and toward the front cover 3. As illustrated in FIG. 1, the inner peripheral portion 80a of the lock-up piston 80 is in sliding contact with the outer peripheral surface of the large-diameter cylindrical portion 301 of the center piece 30 via a seal member such as an O-ring. In addition, the tubular portion 80b of the lock-up piston 80 is spline-fitted to the inner peripheral portion of the clutch hub 81, which is fixed to the front cover 3 (cover body 33), so as not to be rotated with respect to the clutch hub 81. Consequently, the lock-up piston 80 is partially disposed inside the clutch hub 81, and supported by the large-diameter cylindrical portion 301 of the front cover 3 so as to be movable in the axial direction to press the first and second friction engagement plates 83 and 84 toward the side wall portion 34 of the front cover 3. Further, the pressing portion 80c of the lock-up piston 80 faces generally the middle portion (the middle portion between the outer periphery and the inner periphery) of one of the plurality of first friction engagement plates 83 that is positioned closest to the damper mechanism 10, the first friction engagement plates 83 being fitted with the clutch hub 81.

The clutch hub 81 is fixed by welding to the inner surface of the side wall portion 34 of the cover body 33 so as to face the lock-up piston 80. As illustrated in FIG. 1, the clutch drum 82 includes a cylindrical annular portion (an axially extending portion) 82a that extends in the axial direction to the side opposite to the front cover 3, and a plurality of fastening portions 82b that extend radially inward from an end portion of the annular portion 82a and that are fixed to the drive member 11 via a rivet. Consequently, the clutch drum 82 is supported by the damper mechanism 10 and is disposed in an outer peripheral region in the front cover 3 such that the clutch hub 81 is disposed on the outer peripheral side of the clutch hub 81. In addition, as illustrated in FIG. 1, the first intermediate member 12 is fitted with the annular portion 82a of the clutch drum 82. The first intermediate member 12 is supported in the radial direction by the outer peripheral surface of the annular portion 82a to be disposed in an outer peripheral region in the fluid transmission chamber 9. Further, the second plate member 142 of the second intermediate member 14 is rotatably fitted in the annular portion 82a. Consequently, the clutch drum 82 is supported in the radial direction by the outer peripheral surface of the second plate member 142.

Figure 2:
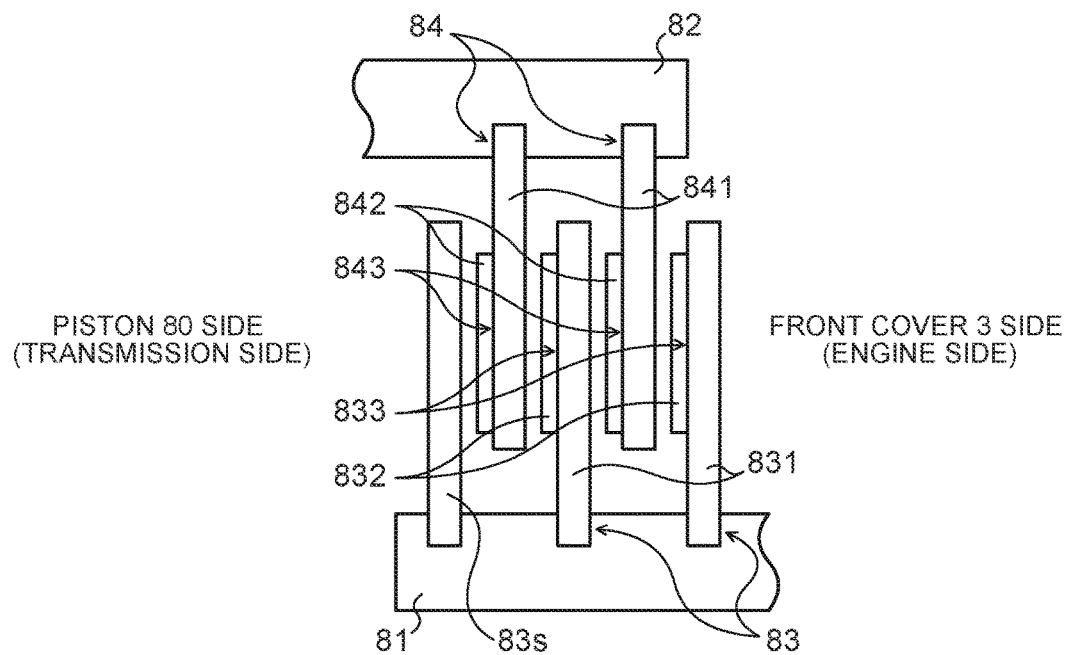
FIG. 2 is a schematic view illustrating an arrangement of first and second friction engagement plates in the clutch according to an exemplary embodiment.
Figure 3:
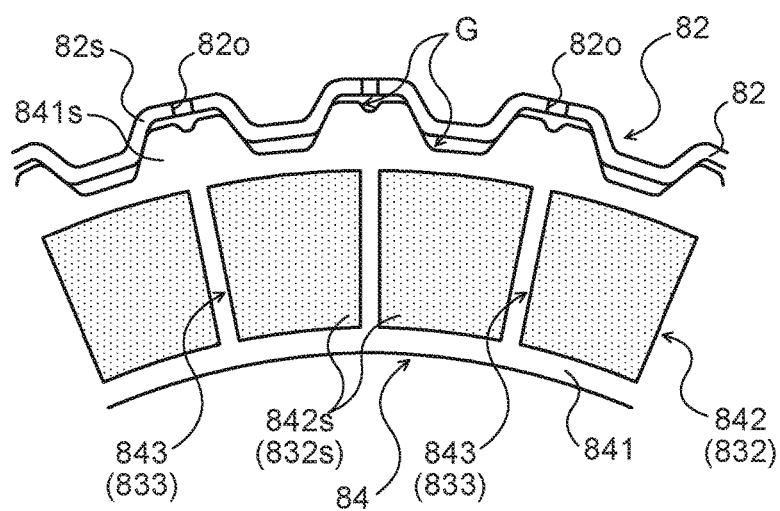
FIG. 3 is an enlarged view illustrating a clutch drum and the second friction engagement plates of the clutch according to an exemplary embodiment.

As illustrated in FIG. 2, the first friction engagement plates 83 are each a so-called one-sided friction plate that includes: an annular plate 831; a friction material 832 affixed to one surface of the annular plate 831; and a plate oil passage (an oil groove) 833 formed on the one surface of the annular plate 831 such that the plate oil passage 833 is dented with respect to the surface of the friction material 832. As illustrated in FIG. 2, in addition, the second friction engagement plates 84 are each a so-called one-sided friction plate that includes: an annular plate 841; a friction material 842 affixed to one surface of the annular plate 841; and a plate oil passage 843 formed on the one surface of the annular plate 841 such that the plate oil passage 843 is dented with respect to the surface of the friction material 842. In the embodiment, as illustrated in FIG. 3, the friction materials 832 and 842 are divided into a plurality of segments 832s and 842s, respectively. By affixing the segments 832s and 842s to the one surface of the annular plates 831 and 841 at equal intervals, respectively, the first and second friction engagement plates 83 and 84 are provided with a plurality of plate oil passages 833 and 843, respectively. The plate oil passages 833 and 843 extend in the radial direction between each of the adjacent segments 832s and each of the adjacent segments 842s, respectively, and have outlets and inlets for oil on the inner peripheral side and the outer peripheral side of the annular plates 831 and 841, respectively. It should be noted, however, the plate oil passages 833 and 843 may only be dented with respect to the surface of the friction materials 832 and 842, respectively, and may be formed by partially recessing one friction material, for example.

The first and second friction engagement plates 83 and 84 are fitted with the clutch hub 81 and the clutch drum 82, respectively, so as to be arranged side by side alternately and such that the friction materials 832 and 842 are positioned on the lock-up piston 80 side. In the embodiment, as illustrated in FIG. 3, the tooth depth of splines 841s formed on the outer periphery of the annular plate 841 of the second friction engagement plate 84 is greater than the tooth depth (tooth groove depth) of splines 82s formed on the inner peripheral side of the clutch drum 82. Consequently, a clearance G that is large enough to allow a flow of working oil is formed between the bottom land of the splines 82s of the clutch drum 82 and the top land of the splines 841s of the second friction engagement plate 84 and between the top land of the splines 82s of the clutch drum 82 and the bottom land of the splines 841s of the second friction engagement plate 84.

In addition, as illustrated in FIGS. 1 and 2, the clutch hub 81 is fitted with a separator plate 83s to which no friction material is affixed and which is positioned closest to the lock-up piston 80 (on the left side in FIGS. 1 and 2). In this way, by disposing the separator plate 83s on the lock-up piston 80 side, the separator plate 83s can be replaced easily during assembly of the lock-up clutch 8, and the stroke of the lock-up piston 80 can be adjusted easily by changing the thickness of the separator plate 83s. In the embodiment, further, the side wall portion 34 of the cover body 33 includes an annular abutment portion 34a (see FIG. 1) that is formed by pressing such that the annular abutment portion 34a projects in the axial direction toward the lock-up piston 80 and that abuts against the back surface (a flat surface to which no friction material 832 is affixed) of one of the first friction engagement plates 83 that is positioned closest to the front cover 3. By forming the abutment portion 34a, which abuts against the first friction engagement plate 83, on the front cover 3 (side wall portion 34) in this way, a so-called backing plate (end plate) can be omitted to reduce the number of parts.

The flange member 85 is formed by pressing a plate material, and includes: an inner peripheral portion 85a fitted with the small-diameter cylindrical portion 302 of the center piece 30; a cylindrical outer peripheral portion 85b that is in sliding contact with the inner peripheral surface of the tubular portion 80b of the lock-up piston 80 via a seal member such as an O-ring to guide movement of the lock-up piston 80 in the axial direction; and a piston movement restriction portion 85c that has an annular surface that extends radially inward (in a direction orthogonal to the axial direction) from the outer edge of the outer peripheral portion 85b on the lock-up piston 80 side. In addition, the inner peripheral portion 85a of the flange member 85 is provided with rotation restriction projecting portions (not illustrated) that project in the axial direction and that engage with corresponding ones of the plurality of rotation restriction recessed portions formed in the recessed portion 303 of the center piece 30.

The inner peripheral portion 85a of the flange member 85 is inserted into the recessed portion 303 such that the rotation restriction projecting portions are fitted with corresponding ones of the rotation restriction recessed portions of the center piece 30, and such that the distal end surface of the inner peripheral portion 85a in the axial direction abuts against the bottom surface of the recessed portion 303. That is, the inner peripheral portion 85a of the flange member 85 is fitted with the small-diameter cylindrical portion 302 so as to be positioned in the recessed portion 303 and overlap the large-diameter cylindrical portion 301 as seen in the radial direction, and fitted with the center piece 30 so as to rotate together with the center piece 30 in the recessed portion 303. The distal end surface of the inner peripheral portion 85a abuts against a portion of the bottom surface of the recessed portion 303 in which the rotation restriction recessed portions are not formed. Consequently, movement of the flange member 85 toward the front cover 3 and the lock-up piston 80 (toward the right side in FIG. 1) is restricted by the bottom surface of the recessed portion 303, which makes the flange member 85 immovable toward the front cover 3, that is, toward the lock-up piston 80. A snap ring 310 is mounted on the small-diameter cylindrical portion 302 of the center piece 30, and the snap ring 310 restricts movement of the flange member 85 in the direction away from the front cover 3 along the axial direction. Consequently, the flange member 85 is fixed to the center piece 30 so as to rotate together with the front cover 3.

The flange member 85, which is fixed to the center piece 30 of the front cover 3 as discussed above, guides movement of the lock-up piston 80 in the axial direction through the outer peripheral portion 85b, and defines an engagement oil chamber 86 together with the lock-up piston 80 on the side of the lock-up piston 80 opposite to the front cover 3 (side wall portion 34) and on the inner side of the first and second friction engagement plates 83 and 84. The engagement oil chamber 86 is supplied with working oil (a lock-up pressure) for engaging the lock-up clutch 8 (for bringing the lock-up clutch 8 into a completely engaged state or a slip state) from a hydraulic control device (not illustrated) connected to an oil pump (not illustrated) driven by the engine. The engagement oil chamber 86 is connected to the hydraulic control device via an oil passage (not illustrated) formed in the input shaft IS of the transmission, an oil passage 30a formed to extend obliquely in the center piece 30 such that the oil passage 30a opens in the axial direction to the engagement oil chamber 86, and an oil passage 305 defined between the bottom surface of the recessed portion 303 and the distal end surface of the inner peripheral portion 85a of the flange member 85 and between the inner peripheral surface of the large-diameter cylindrical portion 301 and the outer peripheral surface of the inner peripheral portion 85a.

In addition, a recess is provided in the vicinity of a joint portion between the center piece 30 and the cover body 33 to be spaced away from the engine in order to avoid interference with members on the engine side. A plurality of return springs 87 are disposed between the vicinity of the joint portion between the center piece 30 and the cover body 33 and the inner peripheral portion 80a of the lock-up piston 80 such that the large-diameter cylindrical portion 301 is surrounded. The front cover 3 and the lock-up piston 80 define a supply oil passage (first space) 88 for working oil (cooling oil) on the inner side of the clutch hub 81, that is, the first and second friction engagement plates 83 and 84. The supply oil passage 88 is supplied with working oil (e.g. a circulation pressure obtained by regulating a drain pressure due to generation of a line pressure) supplied from the hydraulic control device (not illustrated) to the inside of the front cover 3, that is, the fluid transmission chamber 9, via the oil passage (not illustrated) formed in the input shaft IS of the transmission and an oil passage 30b formed in the center piece 30.

Further, as illustrated in FIG. 1, the clutch hub 81 is provided with an opening 810 that allows communication between the supply oil passage 88 and the side of the first and second friction engagement plates 83 and 84 (the outer side of the clutch hub 81), and the clutch drum 82 is provided with an opening 82o that allows communication between the side of the first and second friction engagement plates 83 and 84 (the inner side of the clutch drum 82) and the side of the fluid transmission chamber 9 (the outer side of the clutch drum 82). In the starting device 1 according to the embodiment, a return oil passage 89 that extends on the inner side of the clutch drum 82 and along the back surface (the surface on the left side in FIG. 1) of the flange member 85 on the side opposite to the lock-up piston 80 is defined between the flange member 85 and the damper mechanism 10. The return oil passage 89 communicates with the supply oil passage 88 discussed above on the inner side with respect to the inner peripheral surface of the lock-up piston 80 (inner peripheral portion 80a) and the flange member 85 (inner peripheral portion 85a). In the embodiment, an oil passage that allows communication between the supply oil passage 88 and the return oil passage 89 includes: a communication passage 90 defined between the inner peripheral surface of the center piece 30 and the outer peripheral surface of the turbine hub 7; and a plurality of oil grooves 70a formed in the thrust washer 70 to extend in the radial direction. Consequently, it is possible to form an oil passage that allows communication between the supply oil passage 88 and the return oil passage 89 in a narrow space around the center piece 30 and the turbine hub 7.

Next, the state of flow of working oil in the front cover 3 and the pump shell 40 of the starting device 1 configured as discussed above will be described with reference to FIGS. 4 and 5.

Figure 4:
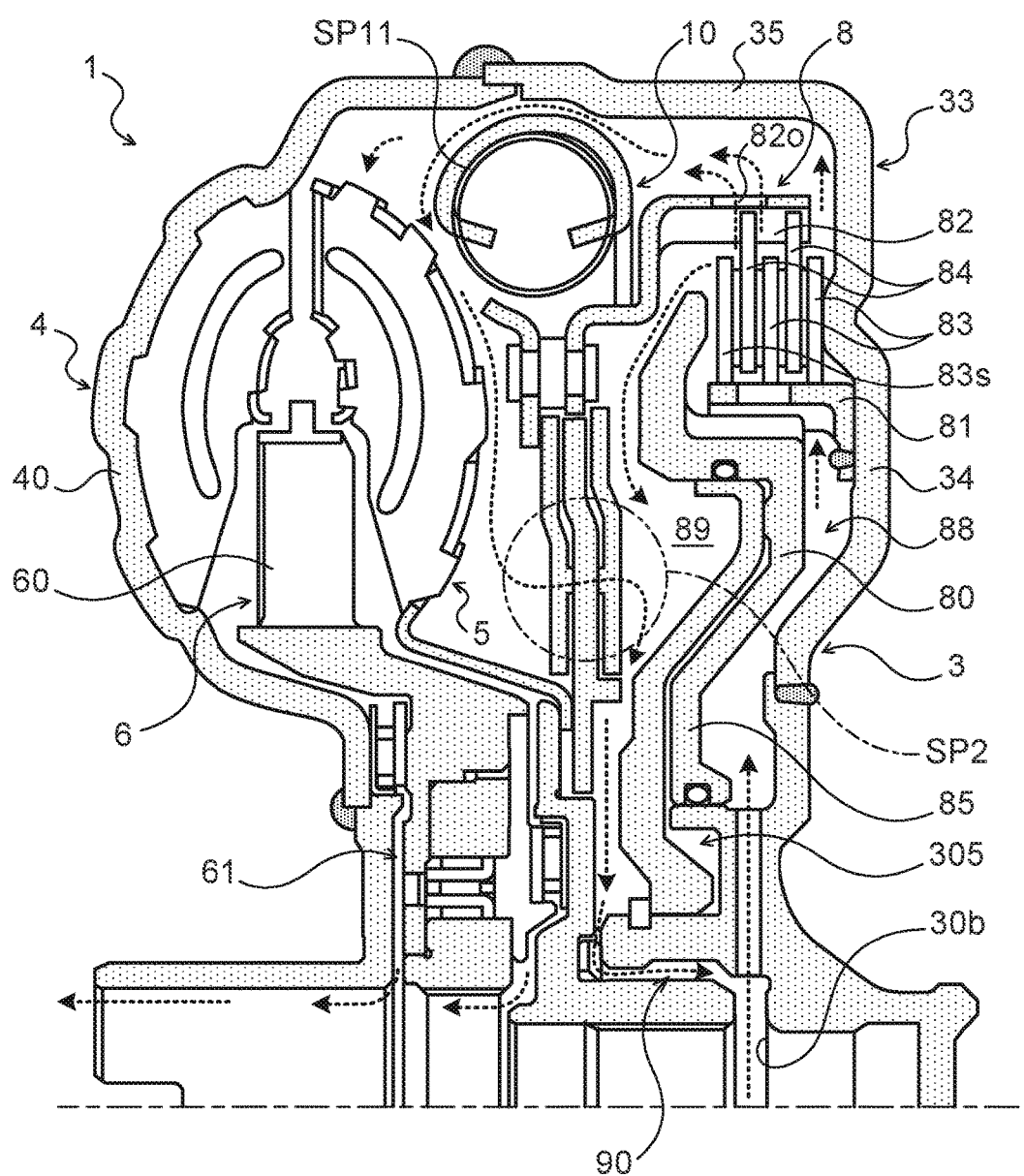
FIG. 4 is explanatory diagram illustrating a state in which working oil flows in a front cover and a pump shell of the starting device of FIG. 1.

As illustrated in FIG. 4, working oil (cooling oil) supplied from the hydraulic control device to the supply oil passage 88 via the oil passage 30b formed in the center piece 30 flows through the opening 810 of the clutch hub 81, the plate oil passages 833 and 843 of the first and second friction engagement plates 83 and 84, and the opening 82o of the clutch drum 82, and flows around the damper mechanism 10 in the fluid transmission chamber 9 and into a torus defined by the pump impeller 4, the turbine runner 5, and the stator 6. Then, the working oil which has flowed in the torus and around the damper mechanism 10 in the front cover 3 and the pump shell 40 is returned to the hydraulic control device via clearances formed on both sides of the one-way clutch 61, an oil passage formed between a sleeve portion of the pump shell 40 and a stator shaft (not illustrated), and so forth. In addition, part of the working oil (cooling oil) which has flowed out from the opening 82o of the clutch drum 82 to the outer side flows into the return oil passage 89 via a clearance in the damper mechanism 10 (e.g. a clearance between the inner peripheral springs SP2) etc. Further, part of the working oil (cooling oil) which has flowed through the plate oil passages 833 and 843 of the first and second friction engagement plates 83 and 84 flows into the return oil passage 89 via a clearance between the lock-up piston 80 and the clutch drum 82. Consequently, the torus, the surroundings of the damper mechanism 10 and the lock-up clutch 8, etc. are filled with working oil.

Figure 5:
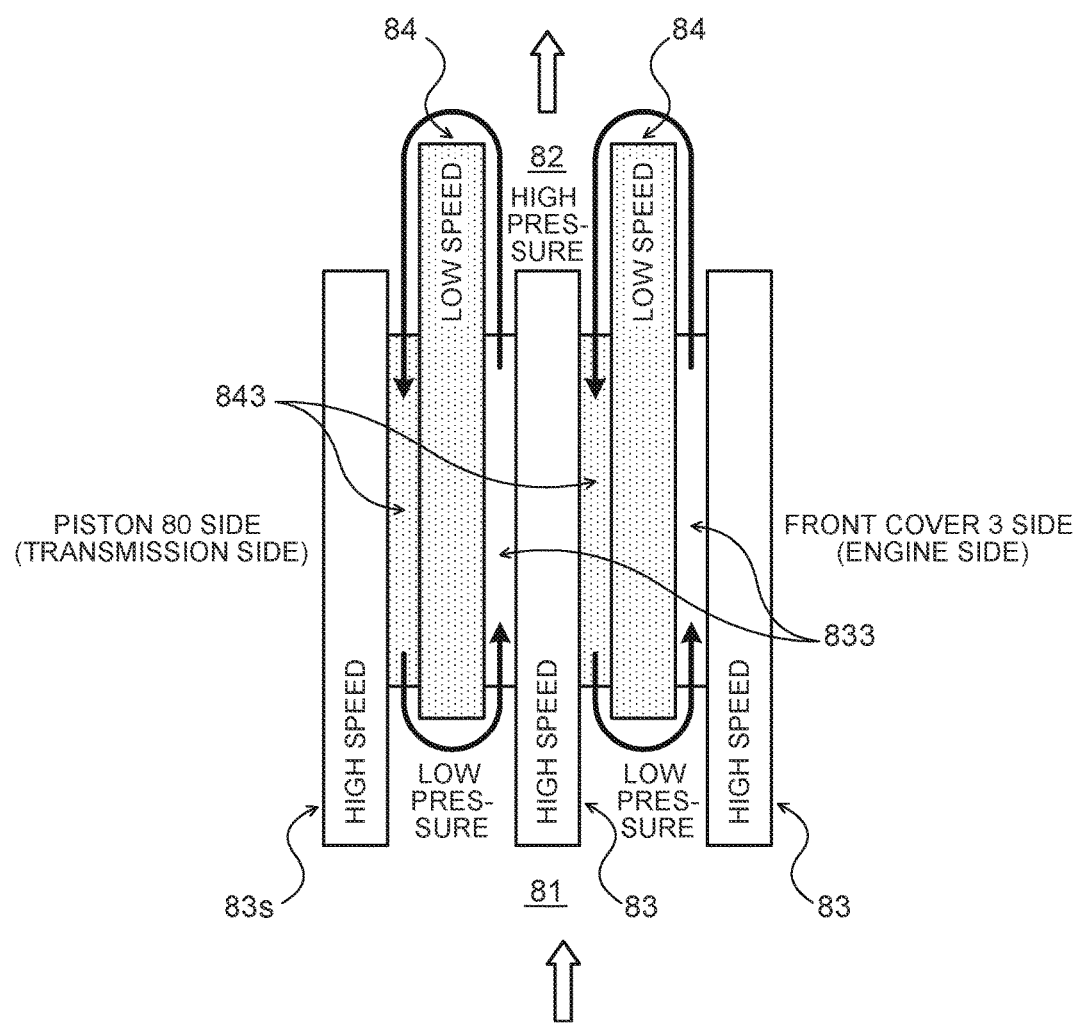
FIG. 5 is a schematic view illustrating a state in which working oil flows around the first and second friction engagement plates in the clutch according to an exemplary embodiment.

Here, when the rotational speed difference (actual slip speed) between the front cover 3 (engine) and the turbine hub 7 (input shaft IS) is caused to coincide with a target slip speed through slip control on the lock-up clutch 8 with the rotational speed of the front cover 3 higher than the rotational speed of the turbine hub 7, the rotational speed of the first friction engagement plates 83, which are fitted with the clutch hub 81 on the front cover 3 (engine) side, becomes higher than the rotational speed of the second friction engagement plates 84, which are fitted with the clutch drum 82 on the turbine hub (input shaft 20) side. Thus, the pressure of working oil in a region in the plate oil passages 833 of the first friction engagement plates 83 on the clutch hub 81 side (inner side) is lowered because of an increase in flow velocity of working oil that flows from the clutch hub 81 side to the clutch drum 82 side in the plate oil passages 833 of the first friction engagement plates 83 and the effect of a centrifugal force (centrifugal hydraulic pressure) that acts on the working oil. As a result, as illustrated in FIG. 5, working oil in the plate oil passages 843 of the second friction engagement plates 84 flows into the plate oil passages 833 of the first friction engagement plates 83 positioned on the front cover 3 side with respect to the second friction engagement plates 84 on the clutch hub 81 side (inner peripheral side) of the first and second friction engagement plates 83 and 84. Accordingly, part of the working oil which has flowed out from the plate oil passages 833 of the first friction engagement plates 83 flows into the plate oil passages 843 of the second friction engagement plates 84 positioned on the lock-up piston 80 side with respect to the first friction engagement plates 83 via the clearance G between the clutch drum 82 and the second friction engagement plates 84 on the clutch drum 82 side (outer peripheral side) of the first and second friction engagement plates 83 and 84.

Consequently, in the starting device 1 which includes the lock-up clutch 8, when slip control is executed with the rotational speed of the front cover 3 higher than the rotational speed of the turbine hub 7, working oil can be circulated through the plate oil passages 833 and 843, which are positioned on both sides of the annular plates 841 of the second friction engagement plates 84, with working oil caused to flow from the clutch drum 82 side to the clutch hub 81 side through the plate oil passages 843 of the second friction engagement plates 84. Consequently, it is possible to increase the amount of working oil that flows (circulates) around the first and second friction engagement plates 83 and 84 (friction materials 832 and 842) to cause heat exchange with the friction materials 832 and 842. In addition, the flow velocity of working oil that flows from the clutch hub 81 side to the clutch drum 82 side in the plate oil passages 833 of the first friction engagement plates 83 is increased, and the pressure of working oil in a region in the plate oil passages 833 of the first friction engagement plates 83 on the clutch hub 81 side (inner side) is lowered, which promotes suctioning of working oil (cooling oil) from the supply oil passage 88 to the radially outer side of the clutch hub 81 (the side of the first and second friction engagement plates 83 and 84). Consequently, it is possible to increase the amount of working oil (cooling oil) suctioned from the supply oil passage 88 to the radially outer side of the clutch hub 81 (the side of the first and second friction engagement plates 83 and 84).

Meanwhile, as discussed above, part of the working oil which has passed through the first and second friction engagement plates 83 and 84 is not circulated around the first and second friction engagement plates 83 and 84, but flows out to the return oil passage 89 side. In the starting device 1, as discussed above, the return oil passage 89 communicates with the supply oil passage 88 via the communication passage 90 between the center piece 30 and the turbine hub 7 and the oil groove 70a of the thrust washer 70, and thus the working oil which has flowed into the return oil passage 89 flows again into the supply oil passage 88 from the return oil passage 89. That is, in the starting device 1, working oil can be circulated also through a path that extends through the supply oil passage 88, the first and second friction engagement plates 83 and 84, the return oil passage 89, and the supply oil passage 88. Thus, even if the amount of working oil (cooling oil) suctioned from the supply oil passage 88 to the radially outer side of the clutch hub 81 (the side of the first and second friction engagement plates 83 and 84) is increased as discussed above, a shortage of working oil due to the increase in amount of the suctioned working oil is supplemented with working oil that flows into the supply oil passage 88 from the return oil passage 89.

As a result, in the starting device 1, it is possible to increase the amount of working oil that flows (circulates) around the first and second friction engagement plates 83 and 84 (friction materials 832 and 842) to cause heat exchange with the friction materials 832 and 842 without increasing the amount of working oil for lubrication and cooling to be supplied to the first and second friction engagement plates 83 and 84, that is, the amount of working oil (cooling oil) to be supplied from the hydraulic control device to the supply oil passage 88 via the oil passage 30*b* in the center piece 30 etc. Further, it is possible to cause the working oil which has been raised in temperature by removing heat from the friction materials 832 and 842 of the first and second friction engagement plates 83 and 84 to be lowered in temperature in the return oil passage 89 and then flow again into the supply oil passage 88. In the starting device 1, in addition, the return oil passage 89 communicates with the supply oil passage 88 via the communication passage 90 and the oil groove 70*a* of the thrust washer 70 which are defined on the inner side with respect to the lock-up piston 80 and the inner peripheral surface of the flange member 85. Consequently, a sufficient length of the return oil passage 89 (in the radial direction) is secured, which makes it possible to cool the working oil which has passed through the first and second friction engagement plates 83 and 84 well while the working oil is flowing through the return oil passage 89.

In the starting device 1, further, suctioning of working oil (cooling oil) from the supply oil passage 88 to the first and second friction engagement plates 83 and 84 is promoted, which increases the flow velocity of the working oil which is directed radially outward in the supply oil passage 88 and lowers the pressure in the supply oil passage 88. This makes it easier to move the lock-up piston 80 toward the front cover 3, which makes it possible to immediately stroke the lock-up piston 80 (bring the lock-up piston 80 into abutment with the separator plate 83*s*) in establishing engagement (complete engagement and slip engagement) of the lock-up clutch 8. As a result, it is possible to further improve the control response of the lock-up clutch 8.

In the starting device 1, in addition, it is possible to further improve the characteristics (so-called T-V characteristics) of the magnitude of transfer torque with respect to the magnitude of the rotational speed difference between the front cover 3 (first friction engagement plates 83) and the turbine hub 7 (second friction engagement plates 84) during slip control. That is, as discussed above, when the rotational speed difference (actual slip speed) becomes larger, the flow velocity of working oil (cooling oil) directed radially outward in the supply oil passage 88 is increased, which lowers the pressure in the supply oil passage 88. This increases the force of the lock-up piston 80 to press the first and second friction engagement plates 83 and 84, which increases torque transferred from the front cover 3 to the turbine hub 7. When the rotational speed difference (actual slip speed) becomes smaller, in contrast, the force of the lock-up piston 80 to press the first and second friction engagement plates 83 and 84 is reduced along with a reduction in pressure of working oil in the supply oil passage 88, which reduces torque transferred from the front cover 3 to the turbine hub 7. As a result, the force of the lock-up piston 80 to press the first and second friction engagement plates 83 and 84 is varied automatically and adequately in accordance with variations in rotational speed difference between the front cover 3 and the turbine hub 7. Thus, in the starting device 1, it is possible to further improve the controllability (ease of control) during slip control, and to reduce the burden of feedback control on the lock-up pressure (engagement hydraulic pressure) based on the rotational speed difference during the slip control.

Further, by improving the cooling performance of the first and second friction engagement plates 83 and 84 by adopting one-sided friction plates as the first and second friction engagement plates 83 and 84 and allowing communication between the return oil passage 89 and the supply oil passage 88, it is possible to make the friction materials 832 and 842 thinner (e.g. about 35 to 55% of friction materials of two-sided friction plates) than the case where two-sided friction plates are adopted. That is, by increasing the amount of working oil that flows (circulates) around the first and second friction engagement plates 83 and 84 (friction materials 832 and 842) as discussed above, it is possible to permit a decrease in flow passage cross-sectional area of the plate oil passages 833 and 843 due to the reduction in thickness of the friction materials 832 and 842. Consequently, it is possible to further shorten the axial length of the lock-up clutch 8 and hence the starting device 1, and to further improve the space efficiency.

In addition, by improving the cooling performance of the first and second friction engagement plates 83 and 84 by adopting one-sided friction plates as the first and second friction engagement plates 83 and 84 and allowing communication between the return oil passage 89 and the supply oil passage 88, it is possible to make the annular plates 831 and 841 thinner (e.g. about 15 to 30% of annular plates of two-sided friction plates) than the case where two-sided friction plates are adopted. That is, by increasing the amount of working oil that flows (circulates) around the first and second friction engagement plates 83 and 84 (friction materials 832 and 842) as discussed above, it is possible to permit a reduction in function of the annular plates 831 and 841 as a heat mass. Consequently, it is possible to further shorten the axial length of the lock-up clutch 8 and hence the starting device 1, and to further improve the space efficiency.

As has been described above, the lock-up clutch 8 included in the starting device 1 adopts, as the first friction engagement plates 83 fitted with the clutch hub 81 on the front cover 3 side and the second friction engagement plates 84 fitted with the clutch drum 82 on the turbine hub 7 side, one-sided friction plates. The one-sided friction plates include annular plates 831 and 841, friction materials 832 and 842 affixed to one surface of the annular plates 831 and 841, respectively, and plate oil passages 833 and 843 formed on the one surface of the annular plates 831 and 841, respectively, such that the plate oil passages 833 and 843 are dented with respect to the surface of the friction materials 832 and 842, respectively. In addition, the engagement oil chamber 86 to which working oil is supplied is defined between the lock-up piston 80 and the flange member 85, and the supply oil passage 88 for supplying working oil (cooling oil) to the first and second friction engagement plates 83 and 84 via the clutch hub 81 is defined between the lock-up piston 80 and the front cover 3 in the axial direction. In the starting device 1 (lock-up clutch 8), the return oil passage 89 for the working oil which has passed through the first and second friction engagement plates 83 and 84 is defined along the back surface of the flange member 85 on the side opposite to the lock-up piston 80, and the return oil passage 89 communicates with the supply oil passage 88. Consequently, it is possible to improve the heat radiation performance of the friction materials 832 and 842 of the first and second friction engagement plates 83 and 84 during execution of slip control while reducing the amount of working oil for lubrication and cooling to be supplied to the first and second friction engagement plates 83 and 84 (supply oil passage 88).

In addition, with the return oil passage 89 and the supply oil passage 88 communicating with each other via the communication passage 90 and the oil groove 70*a* which are defined on the inner side with respect to the lock-up piston 80 and the inner peripheral surface of the flange member 85 as in the embodiment described above, a sufficient length of the return oil passage 89 is secured, which makes it possible to cool the working oil which has passed through the first and second friction engagement plates 83 and 84 well while the working oil is flowing through the return oil passage 89.

In the embodiment described above, further, the first and second friction engagement plates 83 and 84 are fitted with the clutch hub 81 and the clutch drum 82, respectively, such that the friction materials 832 and 842 are positioned on the lock-up piston 80 side. Consequently, the separator plate 83s to which the friction materials 832 and 842 are not affixed can be fitted with the clutch hub 81 so as to be positioned closest to the lock-up piston 80. As a result, the separator plate 83s can be replaced easily, which makes it possible to adjust the stroke of the lock-up piston 80 easily by changing the thickness of the separator plate 83s.

In addition, if the tooth depth of the splines 841s of the second friction engagement plates 84 is greater than the tooth depth of the splines 82s of the clutch drum 82 as in the embodiment described above, a sufficient clearance G is secured between the clutch drum 82 and the second friction engagement plates 84, which makes it possible to cause the working oil which has flowed out from the plate oil passages 833 of the first friction engagement plates 83 to smoothly flow into the plate oil passages 843 of the second friction engagement plates 84. In the embodiment described above, in addition, the return oil passage 89 communicates with the supply oil passage 88 via the communication passage 90, which is defined between the inner peripheral surface of the center piece 30 and the turbine hub 7, and the oil groove 70a, which is formed in the thrust washer 70 which is disposed between the center piece 30 and the turbine hub 7. Consequently, it is possible to form an oil passage that allows communication between the supply oil passage 88 and the return oil passage 89 in a narrow space around the center piece and the turbine hub 7.

Figure 6:
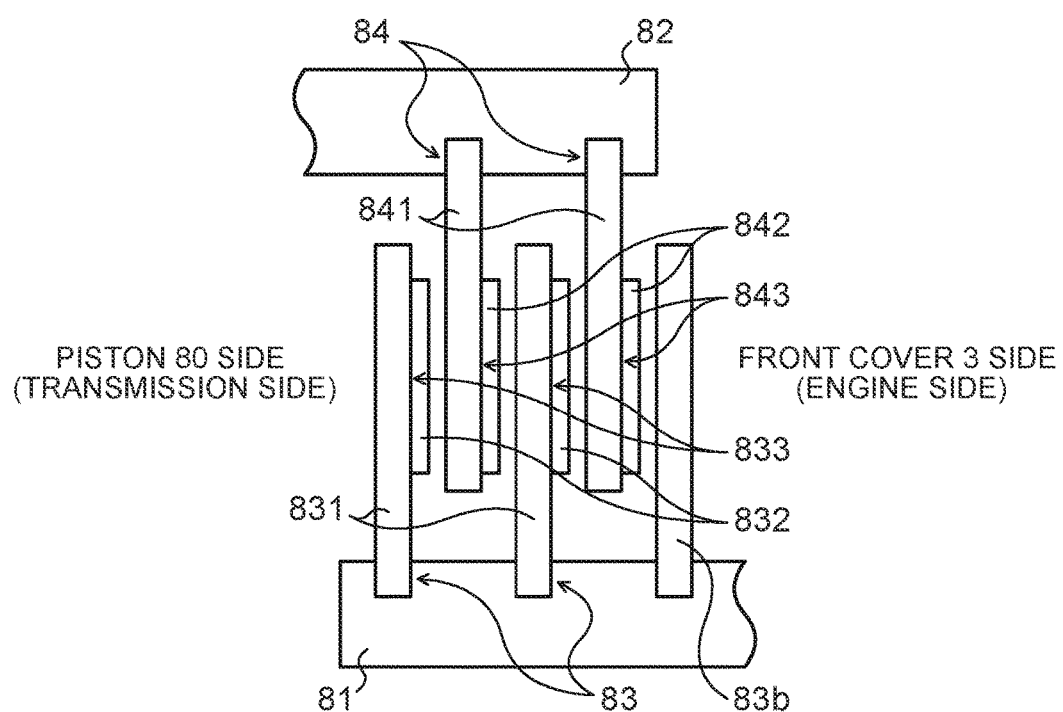
FIG. 6 is a schematic view illustrating another arrangement of the first and second friction engagement plates in the clutch according to an exemplary embodiment.
Figure 7:
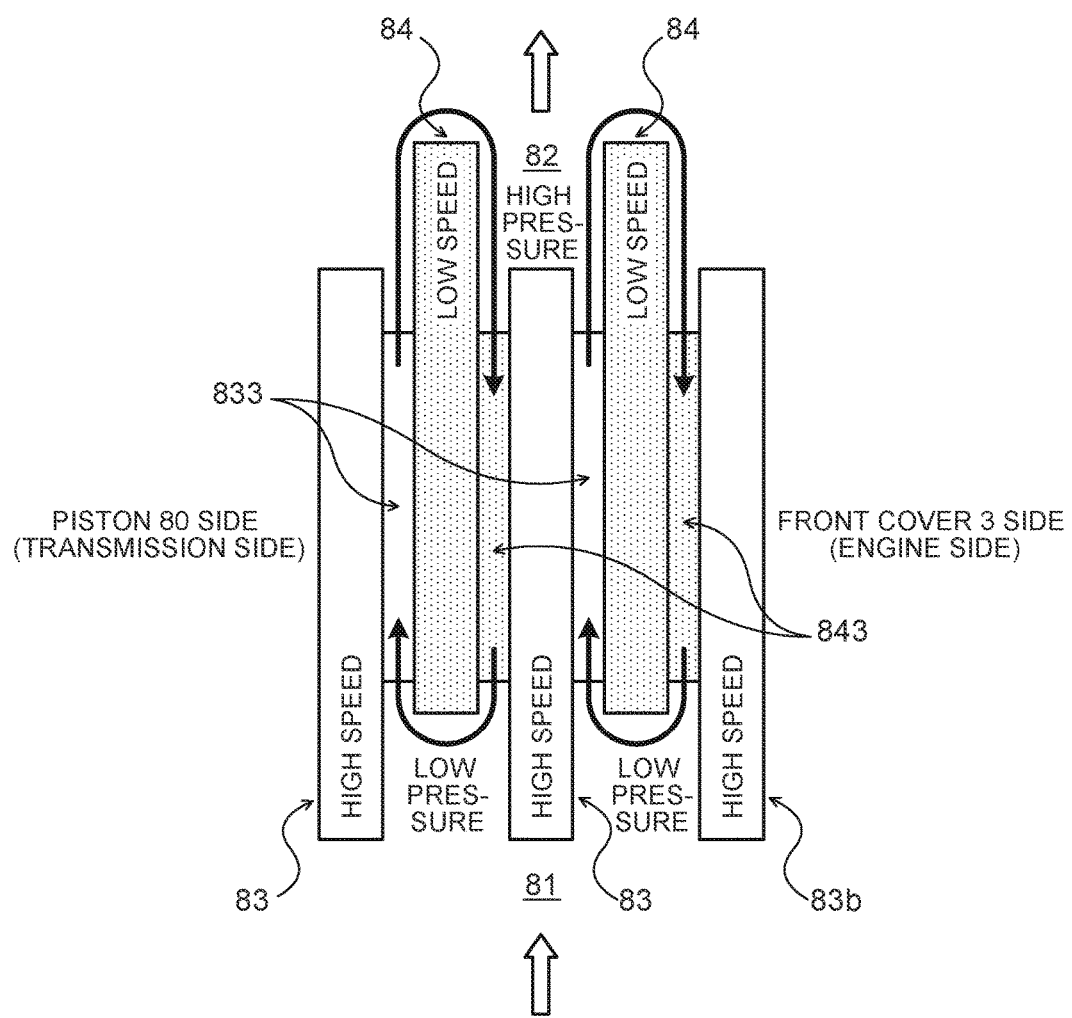
FIG. 7 is a schematic view illustrating a state in which working oil flows around the first and second friction engagement plates disposed as illustrated in FIG. 6.

In the lock-up clutch 8 of the starting device 1, as illustrated in FIG. 6, the first and second friction engagement plates 83 and 84 may be fitted with the clutch hub 81 and the clutch drum 82, respectively, such that the friction materials 832 and 842 are positioned on the front cover 3 side (the right side in FIGS. 1 and 2). Consequently, as illustrated in FIG. 7, part of the working oil which has flowed out from the plate oil passages 833 of the first friction engagement plates 83 flows into the plate oil passages 843 of the second friction engagement plates 84 positioned on the side of the front cover 3, which has a larger surface area to contact outside air, on the clutch drum 82 side, that is, on the outer peripheral side, of the first and second friction engagement plates 83 and 84. As a result, it is possible to suppress a rise in temperature of working oil that flows through the plate oil passages 843 of the second friction engagement plates 84 from the clutch drum 82 side to the clutch hub 81 side.

In addition, the lock-up clutch 8 described above includes: the clutch hub 81 which is fixed to the front cover 3; the lock-up piston 80 which is movable toward the front cover 3 to press the first and second friction engagement plates 83 and 84; the return spring 87 which is disposed between the front cover 3 and the lock-up piston 80 to urge the lock-up piston 80 away from the front cover 3; the engagement oil chamber 86 which is defined by the flange member 85 and the lock-up piston 80; and the supply oil passage 88 which is defined between the lock-up piston 80 and the front cover 3. However, the clutch according to an exemplary embodiment is not limited thereto. That is, the clutch according to an exemplary embodiment may include: a clutch hub fixed to an annular flange member (annular member); a piston that is movable toward the flange member to press first and second friction engagement plates; a return spring disposed between the piston and the flange member in the axial direction to urge the piston away from the flange member; an engagement oil chamber defined between the front cover which serves as an input member and the piston; and a supply oil passage defined between the flange member and the piston.

In the embodiment described above, further, the present disclosure is applied to the lock-up clutch 8 which selectively establishes and releases lock-up in which the front cover 3, which is coupled to the engine, and the turbine hub 7, which is coupled to the clutch drum 82 via the damper mechanism 10 and which is coupled to the input shaft IS of the transmission, are coupled to each other. However, application of the present subject matter is not limited thereto. That is, the present subject matter may be applied to any type of clutch disposed in a space filled with working oil.

The present subject matter is not limited to the embodiment described above in any way, and it is a matter of course that the present subject matter n may be modified in various ways as will be apparent to those skilled in the art. Further, the mode for carrying out the present subject matter described above is merely a specific exemplary embodiment as described in the "SUMMARY" OF THE section, and does not limit the elements in this section.

INDUSTRIAL APPLICABILITY

The present subject matter can be utilized, for example, in the clutch manufacture field etc.

The invention claimed is:

1. A clutch that couples an input member and an output member to each other such that power is transferred from the input member to the output member and that decouples the input member and the output member from each other, comprising:
    an annular member attached to the input member;
    a clutch hub provided on the input member or the annular member;
    a first friction engagement plate fitted with the clutch hub;
    a clutch drum coupled to the output member and disposed on a radially outer side of the clutch hub such that the clutch hub is surrounded;
    a second friction engagement plate fitted with the clutch drum; and
    a piston that is disposed between the input member and the annular member and that is movable in an axial direction to press the first and second friction engagement plates, wherein:
    the first and second friction engagement plates are each a one-sided friction plate that includes an annular plate, a friction material affixed to one surface of the annular plate, and a plate oil passage formed on the one surface of the annular plate such that the plate oil passage is dented with respect to a surface of the friction material;
    an engagement oil chamber, to which working oil is supplied, is defined in one of a space between the piston and the annular member and a space between the piston and the input member, and a supply oil passage, through which cooling oil is supplied to the first and second friction engagement plates via an opening formed in the clutch hub, is defined in the other of the spaces; and
    a return oil passage for the cooling oil which has passed through the first and second friction engagement plates is defined along a back surface of the annular member on a side opposite to the piston, and the return oil passage communicates with the supply oil passage, wherein the return oil passage communicates with the supply oil passage via a communication passage defined on an inner side with respect to an inner peripheral surface of the piston.

2. The clutch according to claim 1, wherein
the first and second friction engagement plates are fitted with the clutch hub and the clutch drum, respectively, such that the friction material is positioned on a side of the piston.

3. The clutch according to claim 2, wherein
the second friction engagement plate is spline-fitted to the clutch drum; and
a tooth depth of splines of the second friction engagement plate is greater than a tooth depth of splines of the clutch drum.

4. The clutch according to claim 3, wherein
the input member includes a tubular center piece to which the annular member is attached and which supports the piston;
the output member is inserted into the center piece with a thrust washer disposed between the center piece and the output member; and
the return oil passage communicates with the supply oil passage via an oil groove formed in the thrust washer, a communication passage defined between an inner peripheral surface of the center piece and the output member, and an oil passage formed in the center piece.

5. The clutch according to claim 4, wherein
the input member is coupled to a motor, and the output member is coupled to the clutch drum via a damper mechanism and coupled to an input shaft of a transmission; and
the clutch is constituted as a lock-up clutch that selectively establishes and releases lock-up in which the input member and the output member are coupled to each other.

6. The clutch according to claim 1, wherein
the first and second friction engagement plates are fitted with the clutch hub and the clutch drum, respectively, such that the friction material is positioned on a side of the input member.

7. The clutch according to claim 1, wherein
the first and second friction engagement plates are fitted with the clutch hub and the clutch drum, respectively, such that the friction material is positioned on a side of the piston.

8. The clutch according to claim 7, wherein
the second friction engagement plate is spline-fitted to the clutch drum; and
a tooth depth of splines of the second friction engagement plate is greater than a tooth depth of splines of the clutch drum.

9. The clutch according to claim 7, wherein
the input member includes a tubular center piece to which the annular member is attached and which supports the piston;
the output member is inserted into the center piece with a thrust washer disposed between the center piece and the output member; and
the return oil passage communicates with the supply oil passage via an oil groove formed in the thrust washer, a communication passage defined between an inner peripheral surface of the center piece and the output member, and an oil passage formed in the center piece.

10. The clutch according to claim 7, wherein
the input member is coupled to a motor, and the output member is coupled to the clutch drum via a damper mechanism and coupled to an input shaft of a transmission; and
the clutch is constituted as a lock-up clutch that selectively establishes and releases lock-up in which the input member and the output member are coupled to each other.

11. The clutch according to claim 1, wherein
the first and second friction engagement plates are fitted with the clutch hub and the clutch drum, respectively, such that the friction material is positioned on a side of the input member.

12. The clutch according to claim 1, wherein
the second friction engagement plate is spline-fitted to the clutch drum; and
tooth depth of splines of the second friction engagement plate is greater than tooth depth of splines of the clutch drum.

13. The clutch according to claim 12, wherein
the input member includes a tubular center piece to which the annular member is attached and which supports the piston;
the output member is inserted into the center piece with a thrust washer disposed between the center piece and the output member; and
the return oil passage communicates with the supply oil passage via an oil groove formed in the thrust washer, a communication passage defined between an inner peripheral surface of the center piece and the output member, and an oil passage formed in the center piece.

14. The clutch according to claim 1, wherein
the second friction engagement plate is spline-fitted to the clutch drum; and
tooth depth of splines of the second friction engagement plate is greater than tooth depth of splines of the clutch drum.

15. The clutch according to claim 1, wherein
the input member includes a tubular center piece to which the annular member is attached and which supports the piston;
the output member is inserted into the center piece with a thrust washer disposed between the center piece and the output member; and
the return oil passage communicates with the supply oil passage via an oil groove formed in the thrust washer, a communication passage defined between an inner peripheral surface of the center piece and the output member, and an oil passage formed in the center piece.

16. The clutch according to claim 1, wherein
the input member includes a tubular center piece to which the annular member is attached and which supports the piston;
the output member is inserted into the center piece with a thrust washer disposed between the center piece and the output member; and
the return oil passage communicates with the supply oil passage via an oil groove formed in the thrust washer, a communication passage defined between an inner peripheral surface of the center piece and the output member, and an oil passage formed in the center piece.

17. The clutch according to claim 1, wherein
the input member is coupled to a motor, and the output member is coupled to the clutch drum via a damper mechanism and coupled to an input shaft of a transmission; and the clutch is constituted as a lock-up clutch that selectively establishes and releases lock-up in which the input member and the output member are coupled to each other.

18. The clutch according to claim 1, wherein the input member is coupled to a motor, and the output member is coupled to the clutch drum via a damper mechanism and coupled to an input shaft of a transmission; and the clutch is constituted as a lock-up clutch that selectively establishes and releases lock-up in which the input member and the output member are coupled to each other.

\* \* \* \* \*